(12) United States Patent
Carrel et al.

(10) Patent No.: US 11,095,619 B2
(45) Date of Patent: Aug. 17, 2021

(54) INFORMATION EXCHANGE FOR SECURE COMMUNICATION

(71) Applicant: Cisco Technology, Inc., San Jose, CA (US)

(72) Inventors: David Mark Carrel, Tiburon, CA (US); Praveen Raju Kariyanahalli, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 266 days.

(21) Appl. No.: 16/019,766

(22) Filed: Jun. 27, 2018

(65) Prior Publication Data

US 2019/0141017 A1      May 9, 2019

Related U.S. Application Data

(60) Provisional application No. 62/539,415, filed on Jul. 31, 2017.

(51) Int. Cl.
*H04L 29/06* (2006.01)
*H04L 29/08* (2006.01)
*H04L 9/08* (2006.01)
*H04L 9/32* (2006.01)

(52) U.S. Cl.
CPC .......... *H04L 63/0428* (2013.01); *H04L 9/083* (2013.01); *H04L 9/0825* (2013.01); *H04L 9/0841* (2013.01); *H04L 9/0891* (2013.01); *H04L 9/3215* (2013.01); *H04L 9/3236* (2013.01); *H04L 67/104* (2013.01); *H04L 63/0442* (2013.01); *H04L 67/141* (2013.01)

(58) Field of Classification Search
CPC ............... H04L 9/3247; H04L 63/0428; H04L 2209/38; H04L 63/0823
USPC ........................................................ 713/161
See application file for complete search history.

(56) References Cited

U.S. PATENT DOCUMENTS

2011/0093710 A1*  4/2011  Galvin .................. H04L 9/3263
                                                              713/169
2015/0326542 A1* 11/2015  Serebrin ................. G06F 9/455
                                                              713/160

\* cited by examiner

*Primary Examiner* — Evans Desrosiers
(74) *Attorney, Agent, or Firm* — Polsinelli PC

(57) ABSTRACT

A system may include a first network device configured to communicate via an encrypted session, and a second network device configured to communicate with the first network device via the encrypted session, where the second network device may be configured to perform operations to facilitate communication via the encrypted session. The operations may include receive a first set of data from a device other than the first network device, where the first set of data is used to communicate via the encrypted session. The operations may also include combine peer-to-peer information to be used by the first network device to communicate via the encrypted session to an encrypted packet, where the peer-to-peer information is combined with the encrypted packet in an unencrypted form. The operations may additionally include send the encrypted packet with the peer-to-peer information to the first network device.

18 Claims, 6 Drawing Sheets

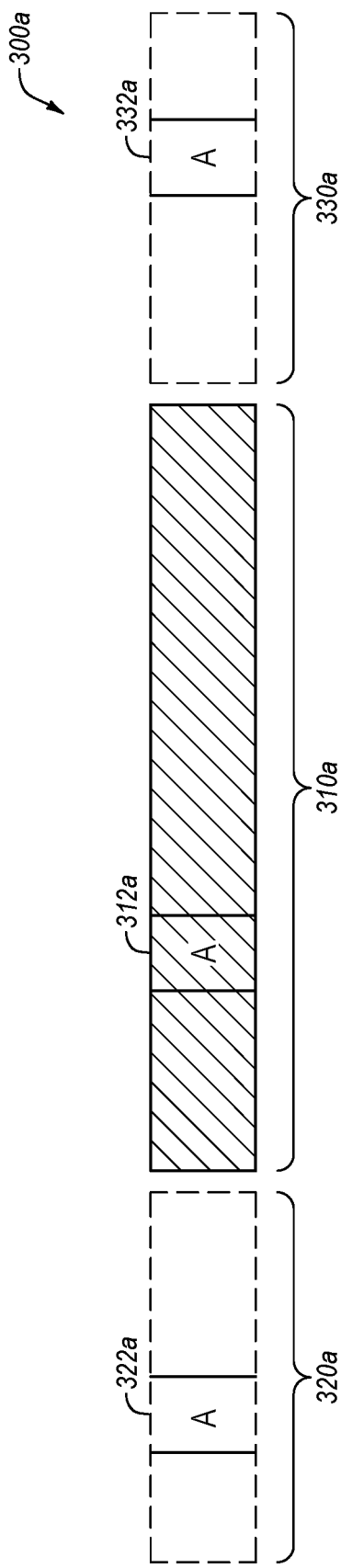
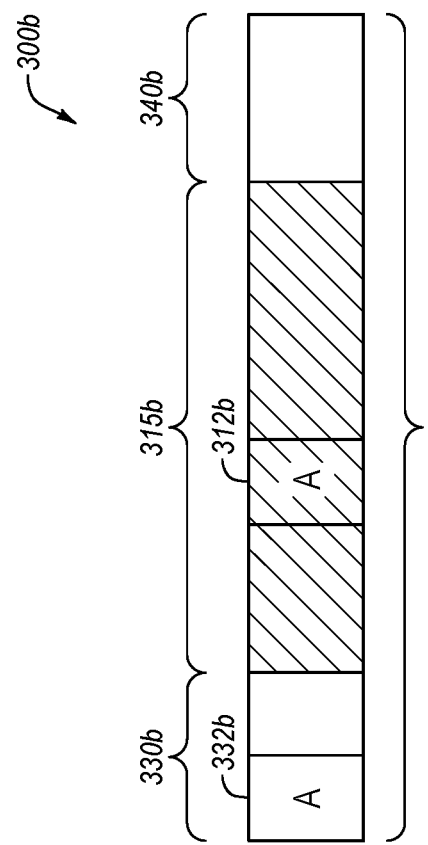
Figure 3A
Figure 3B

INFORMATION EXCHANGE FOR SECURE COMMUNICATION

CROSS REFERENCE TO RELATED APPLICATIONS

This application claims priority to U.S. patent Application Ser. No. 62/539,415, filed Jul. 31, 2017, which is hereby incorporated by reference in its entirety.

FIELD

The embodiments discussed in the present disclosure are related to information exchange for secure communication.

BACKGROUND

The use of networks is a useful tool in allowing communication between distinct computing devices. Some devices in network communications use various techniques to secure communication back and forth with other devices. Some of those techniques include encrypting packets between communicating network devices.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system that may include a first network device configured to communicate via an encrypted session, and a second network device configured to communicate with the first network device via the encrypted session, where the second network device may be configured to perform operations to facilitate communication via the encrypted session. The operations may include receive a first set of data from a device other than the first network device, where the first set of data is used to communicate via the encrypted session. The operations may also include combine peer-to-peer information to be used by the first network device to communicate via the encrypted session to an encrypted packet, where the peer-to-peer information is combined with the encrypted packet in an unencrypted form. The operations may additionally include send the encrypted packet with the peer-to-peer information to the first network device.

One or more embodiments of the present disclosure may include a method of facilitating communication over an encrypted session between a first network device and a second network device. The method may include receiving, at the second network device, a first set of data from a device other than the first network device, where the first set of data may be used by the second network device to communicate via the encrypted session. The method may also include combining, by the second network device, peer-to-peer information with an encrypted packet, where the peer-to-peer information may be configured to be used by the first network device to communicate via the encrypted session and may be combined with the encrypted packet in an unencrypted form. The method may additionally include sending, by the second network device, the encrypted packet combined with the peer-to-peer information to the first network device.

One or more embodiments of the present disclosure may additionally include systems and/or non-transitory computer readable media for facilitating the performance of such methods, such as a system with the control device, the network devices, etc.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A and 3B illustrate examples of packets with information used for secure communication;

DESCRIPTION OF EMBODIMENTS

Figure 1:
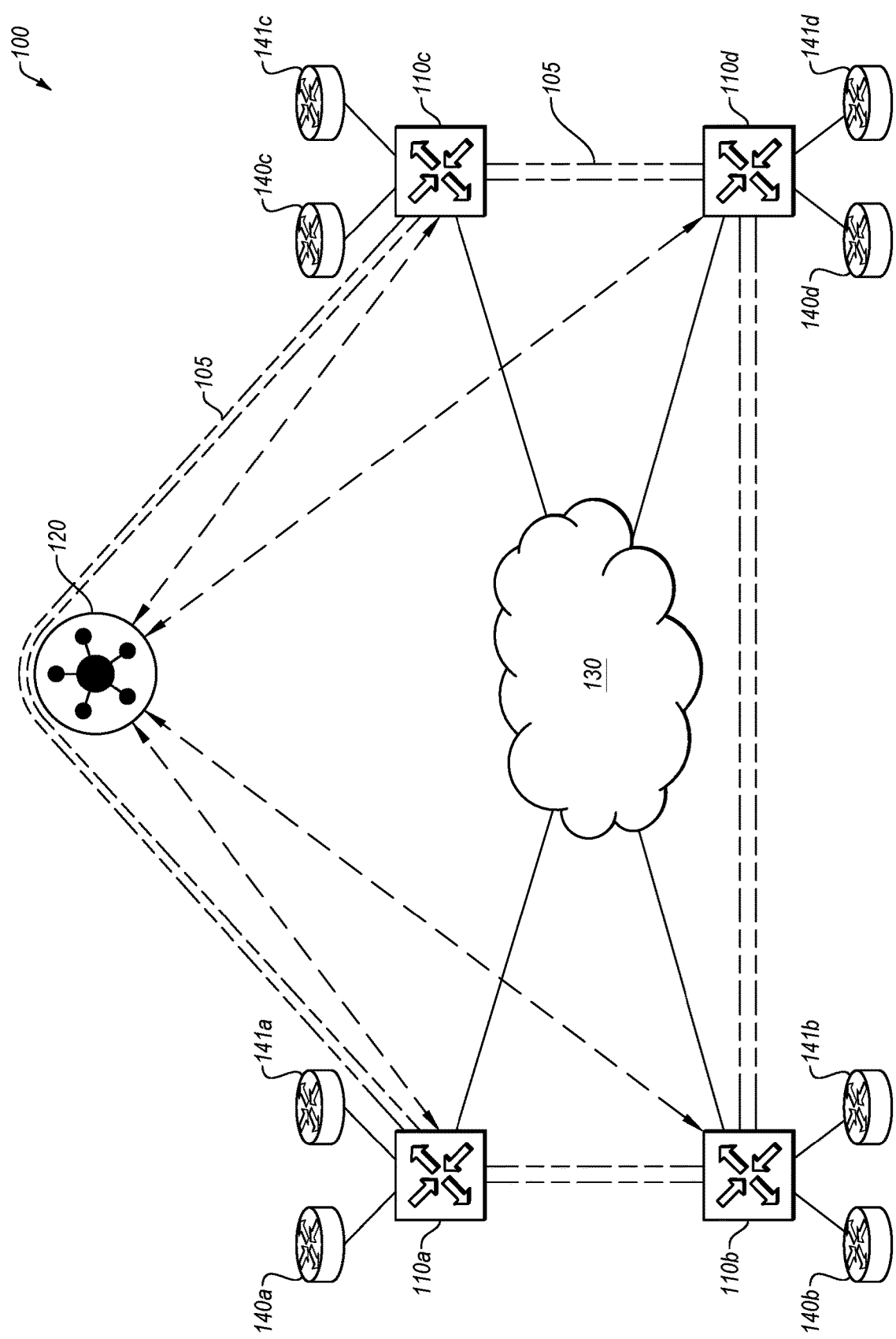
FIG. 1 illustrates an example system of network components implementing a software-defined network with secured communication.

Some embodiments of the present disclosure relate to, inter alia, approaches to establish and/or maintain an encrypted session of communication between two network devices. In some circumstances, a first network device and a second network device that are configured to communicate via an encrypted session may utilize information (e.g., public keys, private keys, source IP address, etc.) to communicate over the encrypted session. However, in some circumstances, such as when keys are distributed to the first and second network devices from a centralized control device, there are certain pieces of information that are more readily obtained from the other network device rather than the control device. Such information may be referred to as peer-to-peer information. For example, if a Network Address Translation (NAT) server sits between the two network devices, the address translation may affect information such as the source and/or destination IP addresses in the encrypted session. Embodiments of the present disclosure may relate to approaches to exchanging and/or otherwise providing information used to communicate in the encrypted session. Examples of such information may include network address information (e.g., the way in which a NAT server has modified a local address to a public address), key version information (e.g., whether a local network device is encrypting a packet using a new or old private key and/or whether the network device is encrypting the packet using a new or old public key of a remote network device), and/or other elements of peer-to-peer information.

In some embodiments, the first network device may append or prepend such peer-to-peer information to an encrypted packet destined for the second network device. The encrypted packet may be encrypted based on the peer-to-peer information. In some embodiments, the peer-to-peer information may be authenticated by the second network device. For example, the peer-to-peer information may be encrypted within the encrypted data packet such that the total packet includes the appended/prepended unencrypted form of the peer-to-peer information in addition to the encrypted version of the peer-to-peer information within the packet. As another example, the centralized control device may authenticate the peer-to-peer information.

Embodiments of the present disclosure may provide improvements to computer networks and to the operation of computers themselves. For example, using one or more embodiments of the present disclosure, network traffic may flow with increased performance preserving valuable network resources such as bandwidth and providing increased response times. Additionally, the amount of traffic flowing through the network may be reduced, providing superior performance for the network. For example, rather than each network device communicating with each other network device in a network to negotiate an encrypted session or to update an on-going encrypted session, the majority of the information to establish such a session is sent from a centralized control device and the peer-to-peer information is combined with packets already being sent back and forth. Additionally, such an approach as described herein may provide greater flexibility in networks. For example, a network with a centralized controller that manages an internal network domain and distributes information such as keys among the network devices that belong to the internal network domain may also utilize NAT servers within the internal network domain without disrupting the secure communications in the internal network domain.

Embodiments of the present disclosure are explained with reference to the accompanying drawings.

FIG. 1 illustrates an example system 100 of network components implementing a software-defined network, in accordance with one or more embodiments of the present disclosure. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d). The edge network device 110 may communicate with each other via secured communication sessions, such as encrypted sessions.

The system 100 may implement a software-defined network. A software-defined network may include a network that is managed by software rather than controlled by hardware. As such, a software-defined network may support multiple types of connections, such as the Internet, Multi-Protocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, a software-defined network may support load balancing or load sharing between the various connections. Further, because of the distributed nature of a network, a software defined network may support virtual private networks (VPNs), firewalls, and other security services. In a software-defined network, for example, a control plane may be functionally separated from the physical topology. In some embodiments, a software-defined network may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, a software-defined network may be implemented as a software-defined wide area network (SD-WAN), local area network (LAN), metropolitan area network (MAN), among others. While one or more embodiments of the present disclosure may be described in the context of an SD-WAN, such embodiments may also be implemented in any software-defined network or any other network that utilizes an out of band mechanism to distribute information used in secure communications. As used herein, the term out of band may include communication outside of a primary communication exchange. For example, if two network devices were communicating via an encrypted session and one of them communicated with a control device, such communication would be an out of band communication.

In some embodiments, the control device 120 may form a control plane connection with each of the edge network devices 110. The control plane connection may facilitate the exchange of data between the edge network devices 110 and the control device 120 for management and control of the internal network domain 105. The control plane connection may operate as a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining optimal or desired paths across the communication network 130 between and among the edge network devices 110. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may receive one or more sets of data for facilitating secure communication within the internal network domain 105. For example, the control device 120 may receive public keys from the edge network devices 110 used in communication of data over the data plane. In these and other embodiments, the control device 120 may reflect the received keys to one or more other edge network devices 110. For example, the control device 110 may receive a key, such as a public key, from a given edge network device 110 and may rebroadcast or otherwise transmit the key to the other edge network devices 110. For example, the control device 110 may periodically broadcast a current version of public key for each edge network device 110 to the other edge network devices 110. The frequency with which the control device 120 may distribute the keys may be based on a frequency with which the edge network devices 110 generate new keys.

In these and other embodiments, a given edge network device 110 may generate a private key and a public key to facilitate secure communication between edge network devices. In these and other embodiments, a set of associated private and public keys may be generated by the given edge network device 110, with the private key remaining with the given edge network device 110 and the public key provided to the control device 120 such that the control device 120 may distribute the public key to other edge network devices that communicate with the given edge network device 110. In such a way, each edge network device that is to communicate with the given edge network device 110 based on the policies of the control device 120 may receive the public key. Furthermore, the internal network domain 105 may eliminate the network traffic of each edge network device 110 sending its updated public key to every other edge network device 110.

In some embodiments, the edge network device 110a and the edge network device 110b may communicate with each other within the internal network domain 105 using a combination of private and public keys of the edge network devices 110a and 110b. In some circumstances, in addition to the public key of the edge network device 110b, the edge network device 110a may additionally utilize peer-to-peer information in establishing or maintaining an encrypted session with the edge network device 110b. To provide such peer-to-peer information to the edge network device 110a, the edge network device 110b may encrypt a packet using the public key of the edge network device 110a and the private key of the edge network device 110b. The packet may be a packet that would otherwise be sent to the edge network device 110a. The edge network device 110b may combine the peer-to-peer information in an unencrypted form with the encrypted packet such that the edge network device 110a may utilize the peer-to-peer information even before decrypting the packet. Additionally or alternatively, the edge network device 110a may utilize the peer-to-peer information to decrypt the packet.

In some embodiments, the peer-to-peer information may include information that may identify a first encryption key and a second encryption key used in encrypting a packet with which the peer-to-peer information is combined. For example, if the edge network device 110a encrypted the payload portion of the packet using a first private encryption key and a second public encryption key of the edge network device 110b, the peer-to-peer information may identify the first private encryption key (and an associated first public encryption key) and may also identify the second public private encryption key (and an associated second private encryption key). In some embodiments, the peer-to-peer information may identify an encryption key version of a local (or a remote) network device. For example, if the edge network device 110a is using a first encryption key and generates a new encryption key, identification between which of the two versions of encryption keys was used to encrypt the packet may be accomplished via the peer-to-peer information. In some embodiments, the peer-to-peer information may be part of a security parameters index (SPI) of an IPsec packet. For example, the payload region may be encrypted according to IPsec protocols, and the header region may include the peer-to-peer information as part of the SPI.

In some embodiments, the peer-to-peer information may be validated by the edge network device 110a prior to utilizing the peer-to-peer information to establish or maintain the encrypted session. For example, the edge network device 110b may encrypt the peer-to-peer information as part of the encrypted packet in addition to the unencrypted form appended/prepended to the packet. In these and other embodiments, the edge network device 110a may compare the peer-to-peer information decrypted from the encrypted packet with the peer-to-peer information appended/prepended to the encrypted packet to verify the peer-to-peer information is the same.

In some embodiments, the edge network device 110a may verify the peer-to-peer information using an out of band mechanism. For example, rather than verifying the peer-to-peer information with data received from the edge network device 110b, the edge network device 110a may verify the peer-to-peer information using data from the centralized control device 120 or another trusted device. For example, the edge network device 110b may submit the peer-to-peer information or other validating information to the control device 120. In these and other embodiments, the edge network device 110a may query the control device 120 to validate the peer-to-peer information.

In some embodiments, traffic within the internal network domain 105 may be encrypted with an encryption scheme, such as various encryption standards or keys. For example, the internal network domain 105 may utilize two-way authentication using Advanced Encryption Standard (AES) with a 256-bit length key over one or more Datagram Transport Layer Security (DTLS) and/or Transport Layer Security (TLS) connections between edge network devices 110. Such encryption may use any protocol, such as Internet Protocol Security (IPSec).

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), and Bi-directional Forwarding Detection (BFD), among others. Additionally or alternatively, the edge network devices 110 may support other network functionalities such as Virtual Local Area Network (VLAN) tagging, Quality of Service (QoS) monitoring, Service Level Agreements (SLA), Internet Protocol (IP) forwarding, Internet Protocol Security (IPsec), Access Control Lists (ACL), among others.

For example, with IPsec, the edge network devices 110 may utilize IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
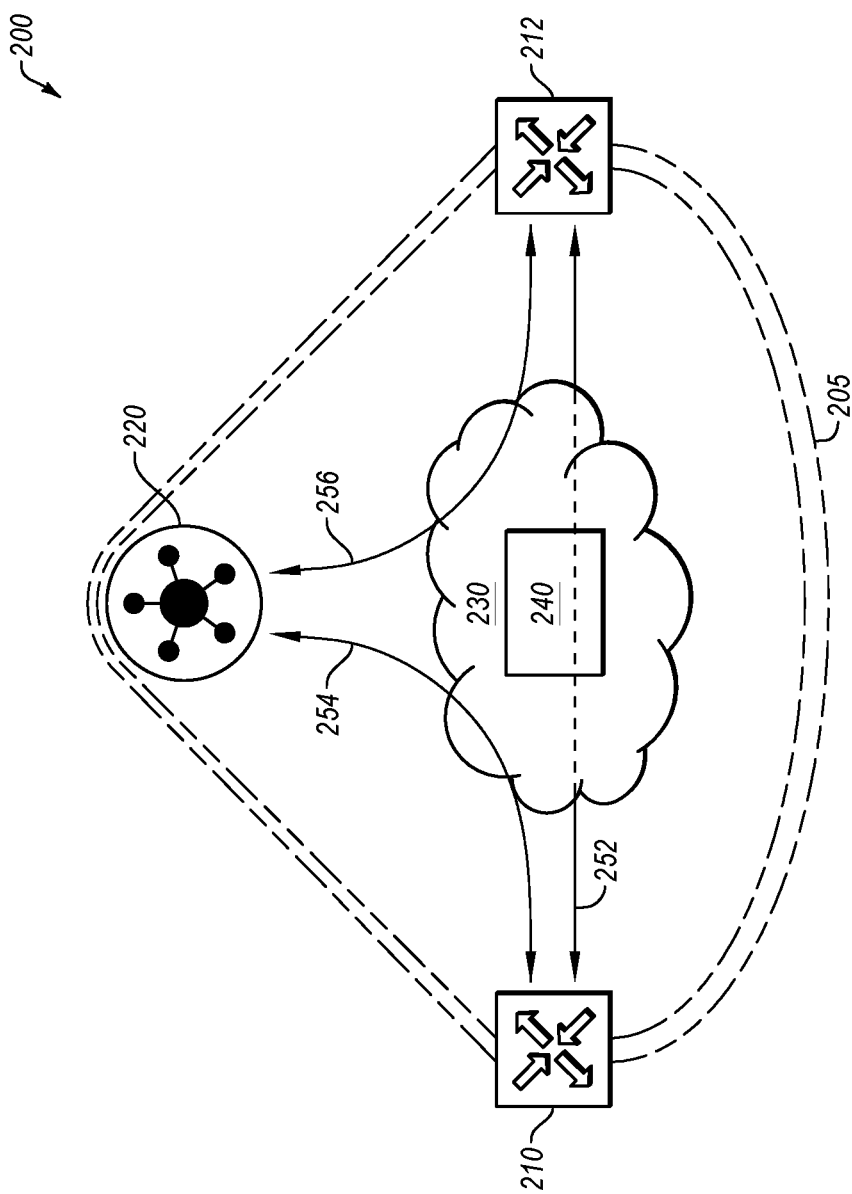
FIG. 2 illustrates another example system of network components with secured communication.

FIG. 2 illustrates another example system 200 of network components with secured communication, in accordance with one or more embodiments of the present disclosure. The system 200 may include an internal network domain 205 (that may be similar or comparable to the internal network domain 105 of FIG. 1) that includes a first edge network device 210 and a second edge network device 212 (that may be similar and/or comparable to the edge network devices 110 of FIG. 1). The internal network domain 205 may include a control device 220 (that may be similar or comparable to the control device 120 of FIG. 1) and a communication network 230 (that may be similar or comparable to the communication network 130 of FIG. 1). The first edge network device 210 may establish and/or maintain a secure communication session over a communication link 252 with the second edge network device 212, such as an encrypted session, as explained below.

As illustrated in FIG. 2, the first edge network device 210 may generate a public key and a corresponding private key. The first edge network device 210 may provide the public key to the control device 220 over a communication link 254. The control device 220 may provide the public key of the first edge network device 210 to the second edge network device 212 over the communication link 256. Additionally or alternatively, the second edge network device 212 may generate a public key and a corresponding private key. The second edge network device 212 may provide the public key to the control device 220 over the communication link 256. The control device 220 may provide the public key of the second edge network device 212 to the first edge network device 210 over the communication link 254.

In some embodiments, a NAT server 240 may be disposed in the communication network 230 between the first edge network device 210 and the second edge network device 212 such that the communication link 252 passes through the NAT server 240. In such an embodiment, the NAT server 240 may convert the private address of the first edge network device 210 to a publicly addressable address. Additionally or alternatively, the NAT server 240 may convert the private address of the second edge network device 2122 to a publicly addressable address. In these and other embodiments, the change of address by the NAT server 240 may disrupt the normal operation of one or more normal security policies, such as IPSec in transport mode. Additionally or alternatively, tunneling may be complicated by the use of NAT traversal through the NAT server 240 because the encrypted session is not exclusively negotiated between the first edge network device 210 and the second edge network device 212. For example, the public keys of the other edge network device may be provided by the control device 220 rather than the other edge network device.

To alleviate this problem, in packets encrypted and sent from the first edge network device 210 to the second edge network device 212, the first edge network device 210 may combine peer-to-peer information with the encrypted packet. For example, when address translation occurs at the NAT server 240, the first edge network device 210 may include address information of the first edge network device 210 such that the second edge network device 212 may observe the way in which the NAT server 240 modifies the address, and/or may utilize the address information in decrypting the packet. Additionally or alternatively, the second edge network device 212 may combine peer-to-peer information with the encrypted packets that it sends to the first edge network device 210.

To combine the peer-to-peer information with an encrypted packet, the peer-to-peer information may be coupled to the packet in any way such that the peer-to-peer information is transmitted with the encrypted packet. For example, the peer-to-peer information may be prepended or appended to the beginning or the end of the encrypted packet. As another example, the peer-to-peer information may be included in unused or unreserved header or footer bits. As an additional example, the peer-to-peer information may be included in a padding section of a packet.

In some embodiments, the second edge network device 212 may verify or authenticate the peer-to-peer information received from the first edge network device 210. For example, the first edge network device 210 may include the peer-to-peer information within the encrypted portion of the packet in addition to the peer-to-peer information combined with the encrypted packet. In such an embodiment, the second edge network device 212 may receive two sets of the same peer-to-peer information, namely, the peer-to-peer information encrypted with the encrypted packet and the same peer-to-peer information, unencrypted, combined with the encrypted packet. The second edge network device 212 may decrypt the encrypted packet and compare the decrypted peer-to-peer information with the unencrypted peer-to-peer information to verify the peer-to-peer information.

In some embodiments, the second edge network device 212 may verify the peer-to-peer information via an out of band mechanism. For example, the first edge network device 210 may send the peer-to-peer information to the control device 220. After receiving the peer-to-peer information, the second edge network device 212 may query the control device 220 to verify the peer-to-peer information. Such an approach may include the second edge network device 212 sending a hash performed on the peer-to-peer information rather than sending all of the peer-to-peer information to the control device 220. Additionally or alternatively, another trusted network device may perform the verification of the peer-to-peer information for the second edge network device 212 in a similar or comparable manner to that described with the control device 220. In these and other embodiments, the control device 220 may provide authentication information to the second edge network device 212 to confirm the authenticity of the peer-to-peer information.

In these and other embodiments, after verifying the peer-to-peer information, the second edge network device 212 may utilize the peer-to-peer information in communicating in the encrypted session over the communication link 252. In these and other embodiments, the peer-to-peer information may be used in initially establishing the encrypted session. Additionally or alternatively, the peer-to-peer information may be used in maintaining or continuing an on-going encrypted session between the first edge network device 210 and the second edge network device 212. For example, if the NAT server 240 modifies the way in which it translates addresses, the peer-to-peer information may facilitate maintaining the information used in communicating in the encrypted session.

In some embodiments, the peer-to-peer information may be combined with each encrypted packet sent from the first edge network device 210 to the second edge network device 212. Additionally or alternatively, the peer-to-peer information may be combined with an encrypted packet at a regular interval, such as every fifty packets (or any number of packets), or every thirty seconds (or any duration of time).

Modifications, additions, or omissions may be made to FIG. 2 without departing from the scope of the present disclosure. For example, while illustrated as communication between the first edge network device 210 and the second edge network device 212, and one control device 220, the system 200 may include any number of edge network devices and control devices 220. As another example, while described as the first edge network device 210 providing peer-to-peer information to the second edge network device 212 and the second edge network device 212 verifying the peer-to-peer information, the same sharing of peer-to-peer information may be performed by the second edge network device 212 providing its peer-to-peer information to the first edge network device 210 and the first edge network device 210 verifying the peer-to-peer information of the second edge network device 212.

FIGS. 3A and 3B illustrate examples of packets with information used for secure communication, in accordance with one or more embodiments of the present disclosure. FIG. 3A illustrates an example packet 300a that may include an encrypted packet 310a combined with peer-to-peer information. FIG. 3B illustrates an example packet 300b with peer-to-peer information included in a header of the packet 300b.

As illustrated in FIG. 3A, the packet 300a may include an encrypted packet 310a. The encrypted packet may be encrypted using any known encryption technique and/or consistent with any protocol, such as IPsec. The encrypted packet 310a may be encrypted using a public key of a remote network device and a private key of a local network device. In some embodiments, peer-to-peer information 312a (designated by the letter A) may be part of the encrypted packet 310a such that the peer-to-peer information 312a is encrypted when the encrypted packet 310a is encrypted.

After encrypting the packet 310a, the packet 300a may be modified to include prepended information 320a which may include peer-to-peer information 322a. The peer-to-peer information 322a may be prepended at the beginning of the encrypted packet 310a. Additionally or alternatively, the packet 300a may be modified to include appended information 330a which may include peer-to-peer information 332a. The peer-to-peer information 332a may be appended at the end of the encrypted packet 310a. In these and other embodiments, the peer-to-peer information 322a (and/or 332a) may be the same as the peer-to-peer information 312a. The peer-to-peer information 312a may be encrypted such that after decrypting the peer-to-peer information 312a, the peer-to-peer information 312a may be used to verify the peer-to-peer information 322a (and/or 332a).

As illustrated in FIG. 3B, in some embodiments, the packet 300b may include an encrypted packet 310b. The encrypted packet 310b may include an encrypted payload region 315b, an unencrypted header region 330b, and/or an unencrypted footer region 340b. Peer-to-peer information 332b may be included in the unencrypted header region 330b. For example, according to some encrypting protocols or secure communication protocols, there may be unused bits in the header that may carry the peer-to-peer information. Additionally or alternatively, although not illustrated, the peer-to-peer information may be included in the footer region 340b.

In some embodiments, the packet 300b may include peer-to-peer information 312b in the encrypted payload region 315b. In these and other embodiments, a network device may use the encrypted peer-to-peer information 312b to verify the unencrypted peer-to-peer information 332b. For example, such a network device may decrypt the peer-to-peer information 312b and compare it to the peer-to-peer information 332b to verify the two are the same.

Modifications, additions, or omissions may be made to FIGS. 3A and/or 3B without departing from the scope of the present disclosure. For example, the peer-to-peer information may be included in one unencrypted portion of the packet or combined in an unencrypted form with an encrypted packet and may verify the unencrypted peer-to-peer information via an out of band mechanism. As another example, various portions of the packets 300a and/or 300b may be encrypted or not encrypted.

Figure 4A:
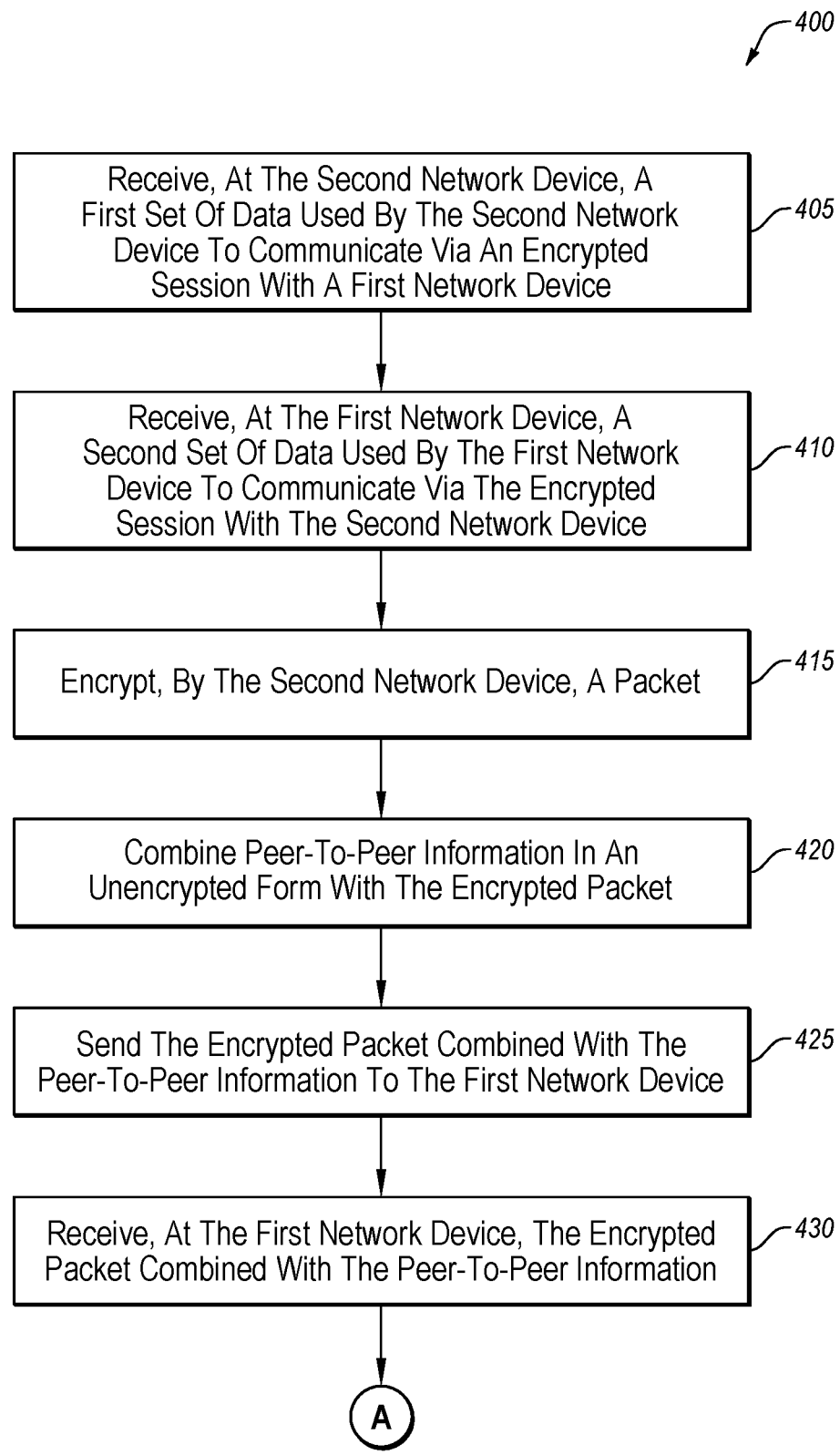
FIGS. 4A and 4B illustrate a flowchart of an example method of facilitating secured communication.
Figure 4B:
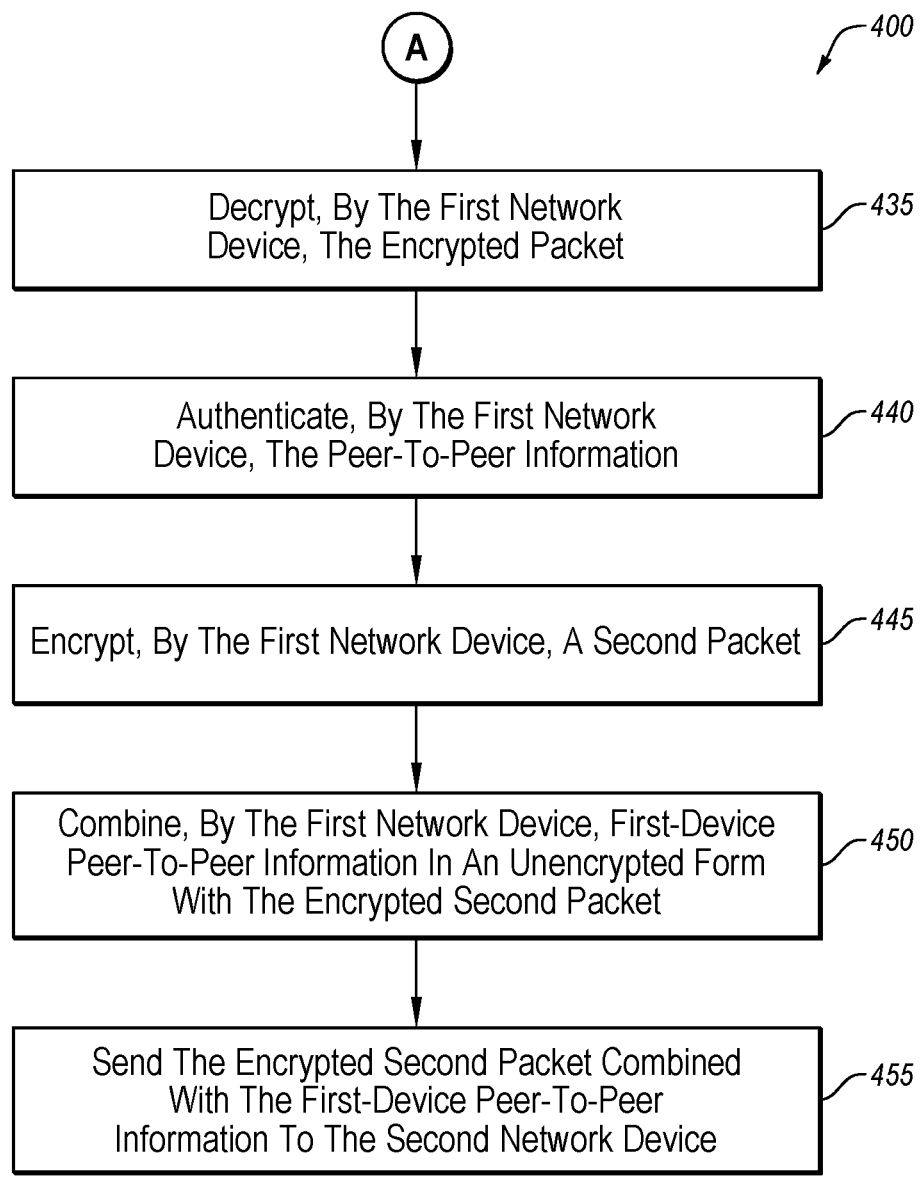

FIGS. 4A and 4B illustrate a flowchart of an example method 400 of facilitating secured communication, in accordance with one or more embodiments of the present disclosure. Although illustrated as discrete blocks, various blocks may be divided into additional blocks, combined into fewer blocks, or eliminated, depending on the particular implementation.

At block 405, a first set of data may be received at a second network device. For example, the second network device (e.g., one of the edge network devices 110 of FIG. 1 and/or the first or second edge network devices 210/212 of FIG. 2) may receive data used by the second network device to communicate via an encrypted session with a first network device (e.g., one of the edge network devices 110 of FIG. 1 and/or the first or second edge network devices 210/212 of FIG. 2). In these and other embodiments, the first set of data may be received from a device other than the first network device. For example, the second network device may receive the first set of data from a control device (e.g., the control device 120 of FIG. 1 and/or the control device 220 of FIG. 2). In some embodiments, the first set of data may include route information between the first network device and the second network device, a public key of the first network device, and/or any other information used by the second network device to establish and/or maintain an encrypted communication session with the first network device.

At block 410, a second set of data may be received at the first network device to be used by the first network device to communicate via the encrypted session with the second network device. For example, the first network device may receive route information between the first network device and the second network device, a public key of the second network device, and/or any other information used by the first network device to establish and/or maintain an encrypted communication session with the second network device.

At block 415, the second network device may encrypt a packet. The packet may be destined for the first network device and configured to be communicated via the encrypted communication session.

At block 420, peer-to-peer information may be combined in an unencrypted form with the encrypted packet. For example, the peer-to-peer information may be appended and/or prepended to the encrypted packet by the second network device. As another example, the second network device may modify an unencrypted header or footer of the encrypted packet to include the peer-to-peer information. In some embodiments, such combination may occur while encrypting the packet. In some embodiments, the peer-topeer information may additionally be included in an encrypted portion of the packet in an encrypted form.

At block 425, the encrypted packet combined with the peer-to-peer information may be sent to the first network device.

At block 430, the first network device may receive the encrypted packet combined with the peer-to-peer information.

As illustrated in FIG. 4B, at block 435, the first network device may decrypt the encrypted packet. In these and other embodiments, the first network device may utilize the unencrypted form of the peer-to-peer information to decrypt the packet.

At block 440, the first network device may authenticate the peer-to-peer information. For example, the first network device may compare the unencrypted peer-to-peer information with decrypted peer-to-peer information. As another example, the first network device may verify or authenticate the peer-to-peer information via an out of band mechanism (e.g., by querying the control device).

At block 445, the first network device may encrypt a second packet. The encrypted packet may include peer-to-peer information of the first network device in the encrypted packet (referred to as first-device peer-to-peer information).

At block 450, the first network device may combine the first-device peer-to-peer information in an unencrypted form with the encrypted second packet. The combination of the block 450 by the first network device may be similar or comparable to the combination performed by the second network device at the block 420.

At block 455, the encrypted second packet combined with the first-device peer-to-peer information may be sent to the second network device.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
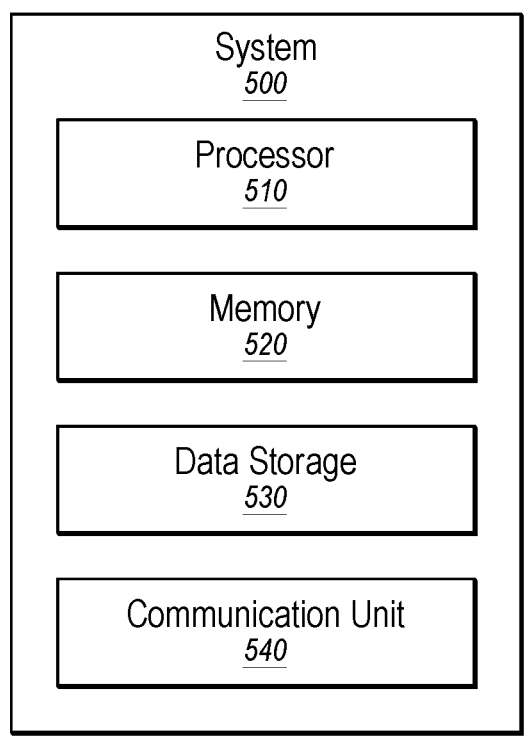
FIG. 5 illustrates an example computing system.

FIG. 5 illustrates an example computing system 500, according to at least one embodiment described in the present disclosure. The system 500 may include any suitable system, apparatus, or device configured to facilitate secure communication between network devices. The computing system 500 may include a processor 510, a memory 520, a data storage 530, and a communication unit 540, which all may be communicatively coupled. In some embodiments, any of the network devices (e.g., the edge network devices 110 of FIG. 1 or 210 of FIG. 2), control devices (e.g., the control devices 120 of FIG. 1 or 220 of FIG. 2), NAT servers (e.g., the NAT server 240 of FIG. 2), or other computing devices of the present disclosure may be implemented as the computing system 500. Additionally or alternatively, one or more of the network devices, control devices, NAT servers, or other computing devices may be implemented as virtualized machines operating on a physical computing system such as the computing system 500.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to perform the method 400 of FIGS. 4A and 4B. For example, the processor 510 may combine peer-to-peer information with an encrypted packet such that another computing system may use the peer-to-peer information for secured communication.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network, such as an MPLS connection, the Internet, a cellular network (e.g., an LTE network), etc. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 540 may permit data to be exchanged with a network and/or any other devices or systems described in the present disclosure. For example, the communication unit 540 may allow the system 500 to communicate with other systems, such as network devices, control devices, and/or other networks.

Modifications, additions, or omissions may be made to the system 500 without departing from the scope of the present disclosure. For example, the data storage 530 may be multiple different storage mediums located in multiple locations and accessed by the processor 510 through a network.

As indicated above, the embodiments described in the present disclosure may include the use of a special purpose or general purpose computer (e.g., the processor 510 of FIG. 5) including various computer hardware or software modules, as discussed in greater detail below. Further, as indicated above, embodiments described in the present disclosure may be implemented using computer-readable media (e.g., the memory 520 or data storage 530 of FIG. 5) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system comprising: a first network device configured to communicate via an encrypted session; and a second network device configured to communicate with the first network device via the encrypted session, the second network device configured to perform operations to facilitate communication via the encrypted session, the operations comprising: receive a first set of data from a device other than the first network device, the first set of data used to communicate via the encrypted session; wherein the first set of data includes route information between the first network device and the second network device and a public key of the first network device, combine peer-to-peer information to be used by the first network device to communicate via the encrypted session to an encrypted packet, the peer-to-peer information combined with the encrypted packet in an unencrypted form; and send the encrypted packet combined with the peer-to-peer information in the unencrypted form to the first network device so the first network device is able to process the encrypted packet using the peer-to-peer information in the unencrypted form; wherein authenticating the peer-to-peer information includes authenticating the peer-to-peer information using authentication information from the device other than the first network device.

2. The system of claim 1, wherein the first network device is configured to perform first-device operations, the first-device operations comprising:
- receive a second set of data from the device other than the first network device, the second set of data used by the first network device to communicate via the encrypted session;
- receive the encrypted packet with the peer-to-peer information in the unencrypted form from the second network device, the peer-to-peer information in the unencrypted form appended and/or prepended to the encrypted packet or in an unencrypted header or footer of the encrypted packet;
- authenticate the peer-to-peer information in the unencrypted form;
- encrypt a second packet based on the second set of data and the peer-to-peer information;
- combine first-device peer-to-peer information with the encrypted second packet in an unencrypted form; and
- send the encrypted second packet with the first-device peer-to-peer information to the second network device.

3. The system of claim 2,
wherein,
- the operations include encrypt the encrypted packet,
- the encrypted packet includes the peer-to-peer information in an encrypted form,
- the first-device operations include decrypt the encrypted packet including the encrypted form of the peer-to-peer information, and
- the peer-to-peer information in the encrypted form is authenticated by comparing decrypted peer-to-peer information with the unencrypted form of the peer-to-peer information.

4. The system of claim 1, wherein the peer-to-peer information includes one of network address translation (NAT) information and version information of one or more encryption keys.

5. The system of claim 1, further comprising:
a control device in communication with the first network device and the second network device, the first set of data received by the first network device from the control device.

6. The system of claim 5,
wherein,
the control device is further configured to provide a second set of data to the first network device, and the second set of data is used by the first network device to communicate via the encrypted session.

7. The system of claim 1, wherein the peer-to-peer information is used to establish the encrypted session.

8. The system of claim 1, wherein the encrypted session is an on-going session and the peer-to-peer information is used to continue the encrypted session.

9. The system of claim 1, wherein the first set of data includes a public key of the first network device.

10. A method of facilitating communication over an encrypted session between a first network device and a second network device, the method comprising: receiving, at the second network device, a first set of data from a device other than the first network device, the first set of data used by the second network device to communicate via the encrypted session; wherein, the first set of data includes route information between the first network device and the second network device and a public key of the first network device, combining, by the second network device, peer-to-peer information with an encrypted packet, the peer-to-peer information to be used by the first network device to communicate via the encrypted session and combined with the encrypted packet in an unencrypted form; sending, by the second network device, the encrypted packet combined with the peer-to-peer information in the unencrypted form to the first network device so the first network device is able to process the encrypted packet using the peer-to-peer information in the unencrypted form; wherein, the first set of data includes route information between the first network device and the second network device and a public key of the first network device.

11. The method of claim 10, further comprising:
receiving, at the first network device, a second set of data from the device other than the first network device, the second set of data used by the first network device to communicate via the encrypted session;
receiving, at the first network device, the encrypted packet combined with the peer-to-peer information in the unencrypted form from the second network device, the peer-to-peer information in the unencrypted form appended and/or prepended to the encrypted packet or in an unencrypted header or footer of the encrypted packet;
authenticating, by the first network device, the peer-to-peer information in the unencrypted form;
encrypting, by the first network device, a second packet based on the second set of data and the peer-to-peer information to yield an encrypted second packet;
combining, by the first network device, first-device peer-to-peer information with the encrypted second packet in an unencrypted form; and
sending the encrypted second packet with the first-device peer-to-peer information from the first network device to the second network device.

12. The method of claim 11, further comprising:
encrypting the encrypted packet by the second network device, the encrypted packet including the peer-to-peer information in an encrypted form in addition to the peer-to-peer information combined in an unencrypted form; and
decrypting, by the first network device, the encrypted packet including the encrypted form of the peer-to-peer information;
wherein the authenticating of the peer-to-peer information includes comparing the decrypted peer-to-peer information with the unencrypted form of the peer-to-peer information.

13. The method of claim 10, wherein the peer-to-peer information includes one of network address translation (NAT) information and version information of one or more encryption keys.

14. The method of claim 10, wherein the peer-to-peer information is used to establish the encrypted session.

15. The method of claim 10, wherein the encrypted session is an on-going session and the peer-to-peer information is used to continue the encrypted session.

16. The method of claim 10, wherein the first set of data includes a public key of the first network device.

17. A non-transitory computer-readable medium containing instructions that when executed by one or more processors cause a network device to perform operations to facilitate an encrypted session between a first network device and a second network device, the operations comprising: receive, by the second network device, a first set of data from a device other than the first network device, the first set of data used by the second network device to communicate via the encrypted session; wherein, the first set of data includes route information between the first network device and the second network device and a public key of the first network device, combine peer-to-peer information with an encrypted packet, the peer-to-peer information to be used by the first network device to communicate via the encrypted session and combined with the encrypted packet in an unencrypted form; and send the encrypted packet combined with the peer-to-peer information in the unencrypted form to the first network device so the first network device is able to process the encrypted packet using the peer-to-peer information in the unencrypted form; wherein, the first set of data includes route information between the first network device and the second network device and a public key of the first network device.

18. The non-transitory computer-readable medium of claim 17,
wherein,
the first set of data includes a public key of the first network device, and
the peer-to-peer information in the unencrypted form is appended and/or prepended to the encrypted packet or in an unencrypted header or footer of the encrypted packet.

\* \* \* \* \*